(12) United States Patent  (10) Patent No.: US 7,539,315 B2
Watanabe et al.  (45) Date of Patent: May 26, 2009

(54) ENCRYPTED COMMUNICATION SYSTEM, KEY DELIVERY SERVER THEREOF, TERMINAL DEVICE AND KEY SHARING METHOD

(75) Inventors: Yuji Watanabe, Yokohama (JP); Masayuki Numao, Kawasaki (JP)

(73) Assignee: International Business Machines Corporation, Armonk, NY (US)

( * ) Notice: Subject to any disclaimer, the term of this patent is extended or adjusted under 35 U.S.C. 154(b) by 597 days.

(21) Appl. No.: 10/511,466

(22) PCT Filed: Apr. 28, 2003

(86) PCT No.: PCT/JP03/05482

§ 371 (c)(1),
(2), (4) Date: Oct. 15, 2004

(87) PCT Pub. No.: WO03/094422

PCT Pub. Date: Nov. 13, 2003

(65) Prior Publication Data

US 2005/0141720 A1  Jun. 30, 2005

(30) Foreign Application Priority Data

Apr. 30, 2002  (JP) .............................. 2002-129359

(51) Int. Cl.
*H04L 9/00*  (2006.01)
(52) U.S. Cl. ........................ 380/279; 380/283; 380/286; 380/45
(58) Field of Classification Search ................. 380/279, 380/283, 286, 45
See application file for complete search history.

(56) References Cited

U.S. PATENT DOCUMENTS 6,813,357 B1 * 11/2004 Matsuzaki et al. .......... 380/279

(Continued)

FOREIGN PATENT DOCUMENTS

JP  09-212089 A2  8/1997

(Continued)

OTHER PUBLICATIONS

Anzai J. et al, "A Flexible Method for Masked Sharing of Group Keys" IEICE Transactons on Fundamentals of Electronics, Communications and Computer Sciences, Institute of Electronics Information and Comm. Eng. Tokyo, JP, vol. E84-A, No. 1, Jan. 1, 2001, pp. 239-246, XP001006545 ISSN: 0916-8508.

(Continued)

*Primary Examiner*—Matthew B Smithers
*Assistant Examiner*—Paul Callahan
(74) *Attorney, Agent, or Firm*—Cantor Colburn LLP; Brian Verminski (57) ABSTRACT

Provided is a method for updating a group key in a highly secure manner and at high speed. A method includes: a step of making subscriber terminals (20) perform a part of decryption of an encrypted group key used to decrypt the information before distribution of the group key; a step of distributing the group key and individual decryption information used to perform a part of remaining decryption other than the part of decryption of the group key and corresponding to terminal devices to the subscriber terminals (20); and a step of making the subscriber terminals (20) perform decryption of the group key using the decryption information being distributed and results obtained by implementing a part of decryption of the group key, the part of decryption previously being performed.

14 Claims, 7 Drawing Sheets

U.S. PATENT DOCUMENTS

| | | | |
|---|---|---|---|
| 7,065,643 | B1 * | 6/2006 | Cornils et al. ............... 713/163 |
| 7,206,412 | B2 * | 4/2007 | Yokota et al. ............... 380/278 |
| 2003/0161474 | A1 * | 8/2003 | Matsuzaki et al. .......... 380/277 |

FOREIGN PATENT DOCUMENTS

JP 2000-216766 A2 8/2000

OTHER PUBLICATIONS

Yoshida M et al: "A Subscriber-Excluding and Trator-Tracing Broadcast Distribution System" IEICE Transactions on Fundamentals of Electronics, Communicatons and Coputer Sciences, Institute of Electronics, Information and Comm. Eng. Tokyo, JP, vol. E84-A, No. 1, Jan. 1, 2001, pp. 247-255, XP001006546 ISSN: 0916-8508.

Naor M, Pinkas B: "Efficient Trace and Revoke Schemes" FC 2000. Proceedings of the 4th International Conference on Financial Cryptography. Lecture Notes in Computer Science, Springer-Verlag, vol. 1962, Feb. 2000, pp. 1-20, XP002326817 Angilla ISBN: 3-540-42700-7.

Sun H-M et al: "Construction of dynamic threshold schemes" Electronics Letters, IEE Stevenage, GB, vol. 30, No. 24, Nov. 24, 1994, pp. 2023-2025, XP006001402 ISSN: 0013-5194.

Natsume Matsuzaki, Jun Anzai, Tsutomu Matsumoto: Light Weight Broadcast Exclusion Using Secret Sharing. Proceedings of ACISP'2000. pp. 313-327.

Jun Anzai, Natsume Matsuzaki, Tsutomu Matsumoto: A Quick Group Key Distribution Scheme with "Entity Revocation". Proc. of ASIACRYPT 1999. pp. 333-347.

Moni Naor, Benny Pinkas: Efficient Trace and Revoke Schemes. Proc. of Financial Cryptography 2000. pp. 1-20.

Dalit Naor, Moni Naor, Jeffrey B. Lotspiech: Revocation and Tracing Schemes for Stateless Receivers. Proc. of CRYPTO 2001. pp. 41-62.

Yuji Watanabe, Masayuki Numao: Multi-round Secure-Light Broadcast Exclusion Protocol with Pre-processing. Proc. of ESORICS 2003. pp. 85-99.

* cited by examiner

ENCRYPTED COMMUNICATION SYSTEM, KEY DELIVERY SERVER THEREOF, TERMINAL DEVICE AND KEY SHARING METHOD

TECHNICAL FIELD

The present invention relates to a cryptographic technique for distribution of a key used for decrypting encrypted information to a subscriber terminal, and particularly to a technique for updating a key in a secure and quick manner.

BACKGROUND ART

There are many cases encountered in which in order to establish a system for supplying information to a previously determined group, a key (group key) is distributed only to a subscriber enrolled as a member of the group and then cryptographic communication through a key is performed. The cryptographic technique is useful in many applications such as distribution of contents to a portable telephone, decipherer/reproducer of a DVD player, distribution of software via CDROM interface, police radio communication and local communication between groups in P2P service.

In the system described above, in the event a part of a terminal device (decoder) is removed away such as in a theft attempt, it is in danger of leakage of a group key to an unauthorized person other than members of the group. For this reason, the used group key has to be updated to create a new key and the new key has to be shared by the members of the group as quickly as possible.

A technique of updating a key has an extremely important role in a system that utilizes a once-established infrastructure for a long period of time.

Assume that in this type of system (hereinafter, refer to as a broadcasting type cryptographic communication system) consisting of a plurality of subscriber terminals, messages are distributed to all subscriber terminals excluding a single subscriber terminal or a plurality of subscriber terminals. Note that the term "exclude" means operation for excluding a certain subscriber terminal (or certain subscriber terminals) from a group and that the excluded subscriber terminal is referred to as "a terminal to be excluded," (hereinafter, refer to as a exclusion-target terminal). In general, when excluding an exclusion-target terminal, it is required to distribute a new group key to each of the individual subscriber terminals other than the exclusion-target terminal. For this reason, as the scale of a group increases, the amount of communication and the amount of time delay required to complete operation for making all the subscriber terminals share a new group key increase.

Conventionally, in order to reduce the above-described amount of time delay required to update the groups key, a variety of techniques have been conceived. A technique (a first conventional technique) disclosed in Japanese Patent Application 2000-196581 is exemplified as a conventional technique of the above-stated type.

The first conventional technique disclosed in the above-stated publication employs an algorithm that makes the amount of communication and the amount of time delay after determination of an exclusion-target terminal not proportional to the number "n" of subscribers as a member of the group. When employing the above-described algorithm and assuming that the maximum number of terminals to be excluded is "k," a number, proportional to "k," of modular exponentiation operations have to be performed by each of the subscriber terminals to calculate the group key. Accordingly, if "k" is far smaller than "n" (k<<n), key distribution according to this technique can be made far more effectively than a general distribution of group key. For instance, when assuming that a system (n=10,000) includes 10,000 subscriber terminals and the number of terminals to be excluded is 100 (k=100), although the general distribution of group key needs processing to be performed a number of times proportional to the number "10,000," key distribution according to the first conventional technique disclosed in the publication needs processing to be performed a number of times proportional to the number "100."

However, in a system (e.g., a system for providing services to mobile terminals such as a portable telephone) including up to some million subscriber terminals and in a similar system, it is required to make the number "k" that represents the maximum number of terminals to be excluded enlarged (e.g., some thousands to some ten thousands) to meet the scale of a group. This makes computation load on a terminal that is poor in its computing ability become considerable, which load is imposed by decryption and is proportional to the number "k." Therefore, it is desirable to perform group key distribution that needs decryption to be performed a number of times not proportional to the number "k," or, if possible, a constant number of times.

Japanese Patent Application 2001-203682 is exemplified as a conventional technique (second conventional technique) to solve the above-described problems.

The second conventional technique disclosed in the publication realizes decryption by performing modular exponentiation operations only "2" times without depending on the number "n," which represents the total number of subscriber terminals, and the number "k," which represents the maximum number of terminals to be excluded. Accordingly, the second conventional technique allows a system including a very large number of subscriber terminals to make quick distribution of a group key.

In a broadcasting type cryptographic communication system, members of a protocol are defined as follows.

Key distribution server: A reliable agency for determining system parameters at the time of setup and distributing personal keys to individual subscriber terminals. When going to distribute a group key, the server determines which subscriber terminals are to be excluded and then distributes the group key through broadcast. The key distribution server is denoted by "S."

Subscriber terminal: A terminal for receiving a broadcast material from the key distribution server. A subscriber terminal "i" receives a personal key "$s_i$" from the key distribution server at the time of setup. A set of subscriber terminals is defined as a set $\Phi = \{1, \ldots, n\}$ (n=|$\Phi$| represents the total number of subscriber terminals).

Subscriber terminal excluded: A subscriber terminal being excluded by the key distribution server. A set of "d" (<k) subscriber terminals to be excluded when the key distribution server distributes a group key in a first round is defined as a subset $\Lambda_l (\subset \Phi)$. Once being excluded, the subscriber terminal is not able to decrypt a group key after the round in which the terminal is excluded and therefore, is never repeatedly excluded in a plurality of rounds. That is, the intersection of two sets, $\Lambda_l \cap \Lambda_{l'} = \{0\}$ (l≠l'). Furthermore, assume that the number, which represents the total number of excluded subscriber terminals, never exceeds the number "k" throughout the rounds (i.e., $|\cup \Lambda_l| \leq k$).

Effective subscriber terminal: A subscriber terminal being not excluded. Assume that a set of subscriber terminals effective in the first round of distribution of group key is defined as a set $\Omega_1 (= \Phi \backslash U^1_{j=1} \Lambda_j)$.

In the broadcasting type cryptographic communication system thus defined, $U_1$ is distributed to the effective subscriber terminals $\Omega_1$ among the entire subscriber terminals $\Phi$ in the first round. Encrypting messages using $U_1$ allows a cryptographic communication of the type used for broadcasting within the group $\Omega_1$. That is, the cryptographic communication is performed as follows.

1. Let $\Omega_0 = \Phi$. The key distribution server distributes a group key "$U_0$" and a personal key key$_i$ to each subscriber "i" (i $\in \Phi$) through a point-to-point and key distribution protocol connection.

2. For each of l≧1, the following processings are repeatedly performed (hereinafter, performing the following processings one time is referred to as "l round").

(a) Key distribution server determines $\Lambda_l \subset \Omega_{l-1}$.
(b) If $k \geq \Sigma^1_{j=l} |\Lambda_j|$, $\Phi := \Omega_{l-1}$, $U_0 := U_{l-1}$ and then return to 1.
(c) Key distribution server distributes a header $H_l$ to $\Omega_l$ to make $\Omega_l$ calculate $U_l$.
(d) $v \in \Omega_l$ calculates $U_l$ using $H_l$ and key$_v$.
(e) Key distribution server and $\Omega_l$ perform broadcasting type cryptographic communication using $U_l$.

Furthermore, in the description hereinafter set forth, the following parameters are employed. "p" and "q" are a large prime number satisfying q|p−1 and "g" is an element of the order "q" on finite field $Z_p$. The size of "p" and "q" is determined so that discrete logarithm problems on a group GF(q), which group consists of "g" as a generating element, becomes computationally difficult. In the following explanation, unless otherwise noted, calculations are all made using modulo p arithmetic. Note that though not described in detail, order "p" can be defined on arbitrary group GF(p) so that solving a discrete logarithm problem becomes computationally difficult, in addition to the definition different from that used in defining order "p" at a prime on group GF(q). For instance, a group constructed by (1) making multiplication operations on an element of order "p" correspond to addition operations on curves such as an elliptical curve on an arbitrary finite field or (2) by letting a prime number "p'" be an exponent instead of a prime number "p" and then performing arithmetic operations on an extension field GF(p') instead of performing remainder operations using a prime number "p'" as a modulus.

E (key, message) indicates message encryption that uses symmetric key encryption. "n" denotes the total number of subscriber terminals and "k" (k<n) denotes the maximum number of terminals to be excluded.

Under the above-described assumption, the broadcasting type cryptographic communication system is required to satisfy the following four requirements in terms of security and efficiency.

1. An effective subscriber terminal $v \in \Omega_l$ is able to independently decrypt a group key $U_l$ (in polynomial time).

2. Even when using a personal key that each of the "k" excluded subscriber terminals owns, any person cannot decrypt a group key (in probabilistic polynomial time) after the round in which the subscriber terminals are excluded.

3. The length of a header used in distribution of group key and the size of personal key that each subscriber terminal owns do not depend on the number that represents the total number of subscriber terminals.

4. When a number of modular exponentiation operations are performed over a time interval over which the header is received to calculate the group key and the decryption of group key (decryption) is completed, the number does not depend on "n" and "k."

The requirement 1 is a requirement requiring that a subscriber terminal effectively be able to independently perform decryption. In a broadcasting type cryptographic communication system, it is important not to place additional traffic on the network when the subscriber terminal needs not to communicate with other terminals upon decryption.

The requirement 2 is a requirement that has to be satisfied to prevent an excluded subscriber terminal from trying to decrypt a session key in conspiracy with other excluded terminals.

The requirement 3 is a requirement that has to be satisfied to prevent significant increase in the amount of processing when the system includes a very large number of subscriber terminals.

The requirement 4 is a requirement that has to be satisfied to decrypt a group key requiring an amount of processing, which amount does not depend on "n" and "k," when "k" needs to be determined large in proportion to the scale of a large group.

So-called "Spare Shadow Attack" and "r publish attack" are included in the requirement 2. A protocol using a time threshold essentially cannot address the problem caused by "Secret Publish Attack." Not that when assuming the number of attackers who reveal a secret is "w," if the number of unauthorized persons is not greater than "k-w," security can be maintained. Accordingly, evaluating the security of protocol under the condition that the total number of unauthorized subscriber terminals, which are in conspiracy with other unauthorized subscriber terminals, is not greater than "k" allows discussion about security within the same field as that of the requirement 2.

The aforementioned conventional technique 1 satisfies the above-stated requirements 1, 2 and 3. The length of an encrypted message to be distributed corresponds to a constant time interval O(k) and the size of a personal key to be distributed corresponds to O(1), meaning that those factors produce extreme efficiency. However, since the number, which represents the number of modular exponentiation operations to be performed to decrypt a group key, equals to O(k) and further, the modular exponentiation operations cannot be placed in pre-calculation prior to reception of the group key, the conventional technique 1 does not satisfy the requirement 4.

The conventional technique 2 focuses its attention on the necessity for the requirement 4 and then provides an algorithm that satisfies the requirement 4. However, the conventional technique 2 does not satisfy the requirement 2, which is most important in terms of security, for the reason resulting from the following analysis. That is, when a group key is distributed finite times, the subscriber terminals being not excluded is able to require secret information about an entire system and further to cancel excluding operation to be performed after the key is distributed finite times (e.g., if k≧5, an attack on the system is possible after the group key is distributed three times).

How the conventional technique 2 does not satisfy the requirement 2 will be shown below. First, the algorithm that the conventional technique 2 employs for a broadcasting type cryptographic communication will be explained.

1. Setup

A key distribution server determines the number "k" that represents the maximum number of terminals to be excluded and randomly selects a $k^{th}$ degree polynomial $Z_q$ represented by the following numerical expression 1.

$$F(x) = \sum_{j=0}^{k} a_j x^j \qquad \text{[Numerical expression 1]}$$

-continued $$G(x) = \sum_{j=0}^{k} b_j x^j$$

$F(0)=S$ and $G(0)=T \pmod{q}$ are secret keys that only the key distribution server knows. The key distribution server distributes $key_i=(s_i, f_i)=(F(i), g^{G(i)/F(i)})$ ($i=1, \ldots n$) to each subscriber terminal "i" via a secret communication path. In addition, the key distribution server randomly selects an element $U_0 \in GF(q)$ and broadcasts the same.

2. Encryption of Group Key

The group key $U_l$ to be distributed in the "l" ($\geqq 1$) round is distributed in the following manner. Randomly select an element $r_l \in Z_q$ and determine $X_l = g^{r_l}$. Then, determine a set $\Lambda_l$ for "d" subscriber terminals to be excluded. Select "(k-d)" pieces of integers from between "n+k(R-1)" and "n+kR," and determine a set $\Theta_l$ consisting of the "(k-d)" pieces of integers. The key distribution server determines $M_{l1}, \ldots, M_{lk}$ based on the following numerical expression 2.

[Numerical expression 2]

$$M_{lj} = r_l F(j) + G(j) \bmod q (j \in \Lambda_l \cup \Theta_l)$$

Finally, the key distribution server determines $E(U_{l-1}, B_l) = E(U_{l-1}, X_l \| [(j, M_{lj}) | j \in \Lambda_l \cup \Theta_l])$ and then broadcasts the same. The group key that is shared in the "l" round is $U_l = g^{r_l S + T}$.

3. Decryption of Group Key

Since the effective subscriber terminal, i.e., an element $v \in \Omega_l$, in the "l" round is an element $v \in \Omega_{l-1}$, the subscriber terminal obtains $U_{l-1}$ in the round "l-1." The subscriber terminal "v" decrypts $B_l$ in the received encrypted message $E(U_{l-1}, B_l)$ using $U_{l-1}$. Then, using the information about $B_l$, the terminal calculates the group key $U_l$ based on the numerical expression 3.

[Numerical Expression 3]

$$U_l = (X_l f_v)^{W_{l1}} g^{W_{l2}}$$

where, $$W_{l1} = s_v L(v) \bmod q$$ [Numerical expression 4]

$$W_{l2} = \sum_{j \in \Lambda_l \Theta_l} (M_{lj} L(j)) \bmod q$$

Furthermore, L(j) is an interpolation coefficient given by Lagrange polynomial, represented by the following numerical expression 5.

$$L(j) = \prod_{t \in \Lambda_l \cup \Theta_l \cup \{v\}/\{j\}} t/(t-j) \bmod q$$ [Numerical expression 5]

Subsequently, how the algorithm employed in the conventional technique 2 does not satisfy the requirement 2 will be shown. How the effective and optional subscriber terminal $\forall_v$, i.e., an element $\forall_v \in \Omega_R$, in the "R" round calculates and determines the secret information "S" and "T" that only the key distribution server should know will be shown in detail. The terminal "v" obtains (j, $M_{lj}$) (l=1, \ldots, R, j=1, \ldots, k) in the rounds 1 to R and the obtained (j, $M_{lj}$) satisfies the relationship represented by the following numerical expression 6.

$$M_{lj} = r_l \sum_{i=0}^{k} a_i j^i +$$ [Numerical expression 6]

$$\sum_{i=0}^{k} b_i j^i \bmod q (l = 1, \ldots, R, j \in \Lambda_l \cup \Theta_l,$$

$$|\Lambda_l \cup \Theta_l| = k)$$

Note that since "j" is known, the "kR" pieces of equations are obtained for "2k+2+R" pieces of variables, $a_0, \ldots, a_k, b_0, \ldots, b_k, r_1, \ldots, r_R$. That is, when "R" satisfies the following numerical expression 7, all the secret keys, i.e., "S" ($=a_0$) and "T" ($=b_0$), that the key distribution server owns can be calculated.

$$2k + 2 + R \leq kR \Leftrightarrow R \geq \frac{2(k+1)}{k-1}$$ [Numerical expression 7]

For instance, if $k \geqq 5$, all the effective subscriber terminals can calculate in the 3 round the secret key (such as "S" and "T") that the key distribution server owns. This indicates that the conventional technique 2 does not satisfy the requirement 2.

DISCLOSURE OF THE INVENTION

Therefore, an object of the present invention is to provide a method for updating a group key in a highly secure and sufficiently quick manner while satisfying the aforementioned four requirements.

Furthermore, in addition to the above-mentioned object, the present invention has been conceived to provide a highly secure and highly efficient broadcasting type cryptographic communication.

In order to achieve the above described objects, the present invention is realized as a cryptographic communication system including a key distribution server for distributing a key used to decrypt encrypted information and a specific number of subscriber terminals making use of the information. The cryptographic communication system according to the first aspect of the present invention is characterized in that the key distribution server is constructed such that the key distribution server distributes: an encrypted first group key used to decrypt the information; individual decryption information corresponding to the specific number of subscriber terminals and used to perform decryption of the first group key; and individual key update information corresponding to the specific number of subscriber terminals and used to perform a part of decryption of a second group key that is updated after a group key is updated, and the specific number of subscriber terminals is constructed such that the specific number of subscriber terminals decrypt the first group key distributed from the key distribution server by making use of results obtained by processing operations performed based on the key update information previously obtained and used to decrypt the first group key, and further making use of the decryption information distributed from the key distribution server. Distributing operation, in the time domain, for decrypting the group key reduces the amount of processing at the time of update of the group key.

The specific number of subscriber terminals implement a part of decryption of the group key before distribution of the group key. Previously implementing a part of decryption of the group key in the subscriber terminal before distribution of the group key makes it possible to reduce a time interval required to perform processing after distribution of a new group key without losing security at the time of update of group key.

Preferably, in the cryptographic communication system, the key distribution server distributes to the specific number of subscriber terminals key update information, used to decrypt the first group key, together with a third group key that is in a state before the third group key gets updated to the first group key.

Furthermore, in the event where the key distribution server updates the group key, the key distribution server determines which subscriber terminals among the specific number of subscriber terminals are to be excluded and distributes to the specific number of subscriber terminals, together with the group key being updated, the decryption information used by remaining subscriber terminals other than the exclusion-target subscriber terminals to make the remaining subscriber terminals able to decrypt the group key being updated.

In order to achieve the above described objects, the present invention is additionally realized as a key distribution server, constructed as described below, for distributing a key used to decrypt encrypted information. The key distribution server is characterized by including: means for generating a first group key used to decrypt the information and encrypting the first group key; means for generating individual decryption information used to perform decryption of the first group key and corresponding to subscriber terminals; means for generating individual key update information used to perform a part of decryption of a second group key, the second group key being updated after a group key is updated, and corresponding to the subscriber terminals; and means for distributing the first group key, the decryption information and the key update information to the subscriber terminals.

In order to achieve the above described objects, the present invention is also realized as a terminal device constructed as described below. The terminal device is characterized by including: means for retrieving from a specific key distribution server a group key encrypted to decrypt encrypted information and decryption information used to decrypt the group key; means for performing a part of decryption of the group key before distribution of the group key; and means for decrypting the group key by making use of results obtained by processing operations performed based on a part of decryption of the group key and the decryption information retrieved from the key distribution server.

Moreover, the present invention is also realized as a program for controlling a computer and then making the computer operate as the above-described key distribution server and/or terminal device. The program can be provided such that the program is stored on a magnetic disk, an optical disk and/or other storage media such as a semiconductor memory, and then those media are handed over or distributed via a network.

Additionally, the present invention is realized as a key sharing method, constructed as described below, for making a specific number of terminals using the information share a key used to decrypt encrypted information. That is, the key sharing method is characterized in that the method includes: a step of making the specific number of terminals perform a part of decryption of an encrypted group key used to decrypt the information before distribution of the group key; a step of distributing to the specific number of terminals the group key and individual decryption keys used to perform a part of remaining decryption other than the part of decryption of the group key and corresponding to the specific number of terminals; and a step of making the specific number of terminals perform decryption of the group key using the decryption information being distributed and results obtained by performing a part of decryption of the group key, the part of decryption previously being performed.

BEST MODE FOR CARRYING OUT THE INVENTION

The present invention will be explained in detail below based on an embodiment depicted in the attached drawings.

Figure 1:
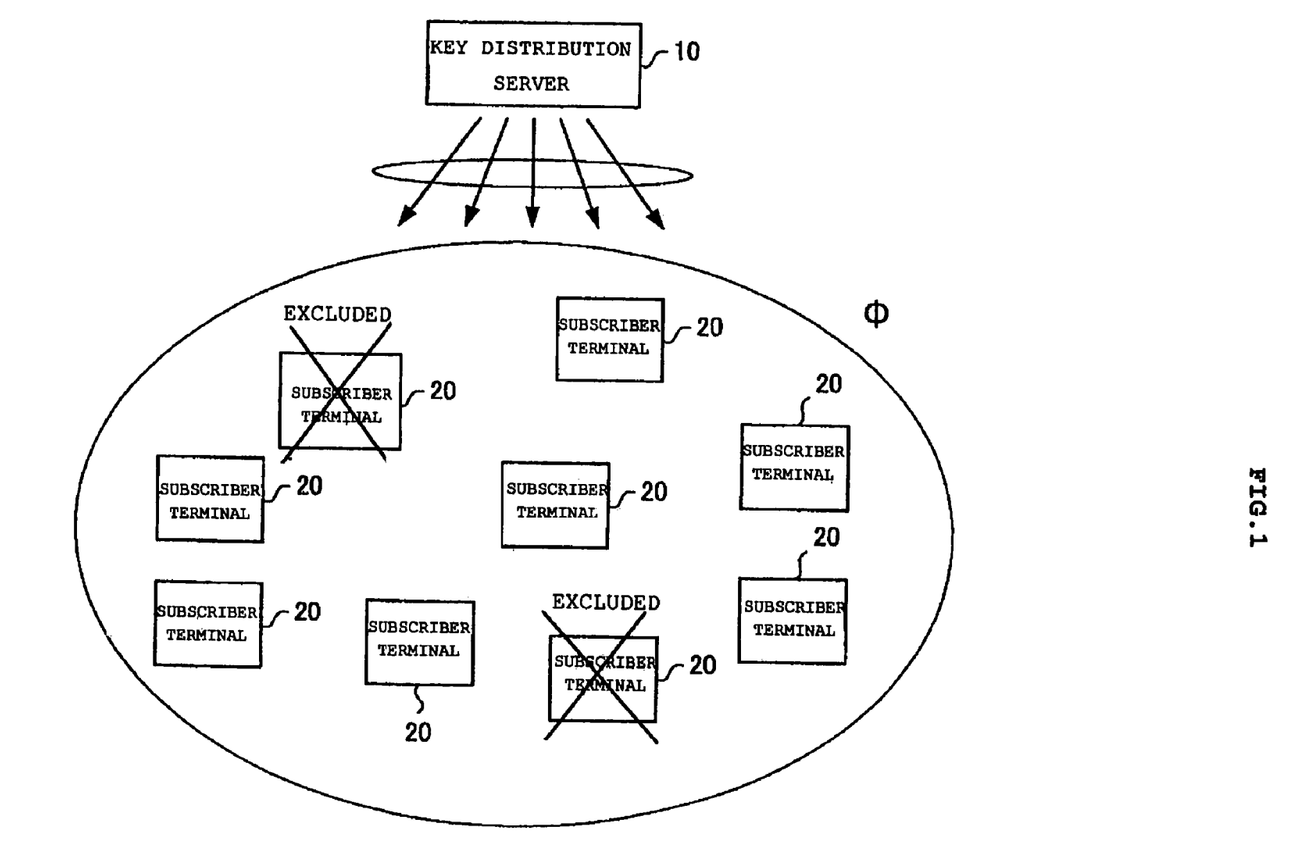
FIG. 1 is a diagram explaining the general configuration of a broadcasting type cryptographic communication system, according to the embodiment.

FIG. 1 is a diagram illustrating the general configuration of a broadcasting type cryptographic communication system according to the embodiment.

Referring to FIG. 1, the broadcasting type cryptographic communication system according to the embodiment comprises a key distribution server 10 for generating a group key used to perform cryptographic communication and distributing the key, and subscriber terminals 20 for obtaining the group key distributed from the key distribution server 10 and performing cryptographic communication using the key.

The key distribution server 10 is realized by employing a workstation, a personal computer or other computing devices having networked function and determines system parameters at the time of setup, and then, distributes a personal key to each of the subscriber terminals 20. When distributing a group key, the server determines which subscriber terminals 20 are to be excluded and then decrypts the group key, and thereafter, distributes the key as a broadcast material. Processing such as generation, distribution, etc., of the personal key and the group key is realized, for example, as a function of a program-controlled CPU.

The subscriber terminal 20 is realized by employing a workstation, a personal computer, a portable telephone, a Personal Digital Assistant (PDA) or other information terminal equipments having networked function and receives a broadcast material from the key distribution server 10. The subscriber terminal "i" (i-th subscriber terminal 20) receives a personal key $s_i$ from the key distribution server 10 at the time of setup. Then, the terminal decrypts the encrypted group key using the personal key $s_i$ and further, decrypts a specific message using the group key and then makes use of the message. Those processing is realized by employing, for example, a program-controlled processor. Assume that a set of the subscriber terminals 20 is defined as a set $\Phi=\{1,\ldots,n\}$ (n=|$\Phi$| represents the total number of the subscriber terminals 20).

The entire subscriber terminals 20 constitute a group $\Phi$ that performs cryptographic communication using the group key distributed from the key distribution server 10. Although the individual subscriber terminals 20 constituting the group are initially "effective subscriber terminals" that are able to participate in cryptographic communication, after one or more subscriber terminal becomes an "excluded subscriber terminal" for some reason, the excluded terminal is never able to participate in the cryptographic communication. That is, the excluded terminal is never able to decrypt the group key using the personal key.

A communication configuration employed in the embodiment may be a client/server system in which information is communicated between the key distribution server 10 or a specific server and the subscriber terminals 20, or may be a Peer to Peer system in which information is communicated between the subscriber terminals 20. That is, a supplier who supplies a message (contents) used by the subscriber terminal 20 may exist at a location separated from the key distribution server 10.

The cryptographic communication using a group key and performed within the broadcasting type cryptographic communication system includes four phases, i.e., group key setup, information encryption using a group key, information decryption using a group key and key updating.

Figure 2:
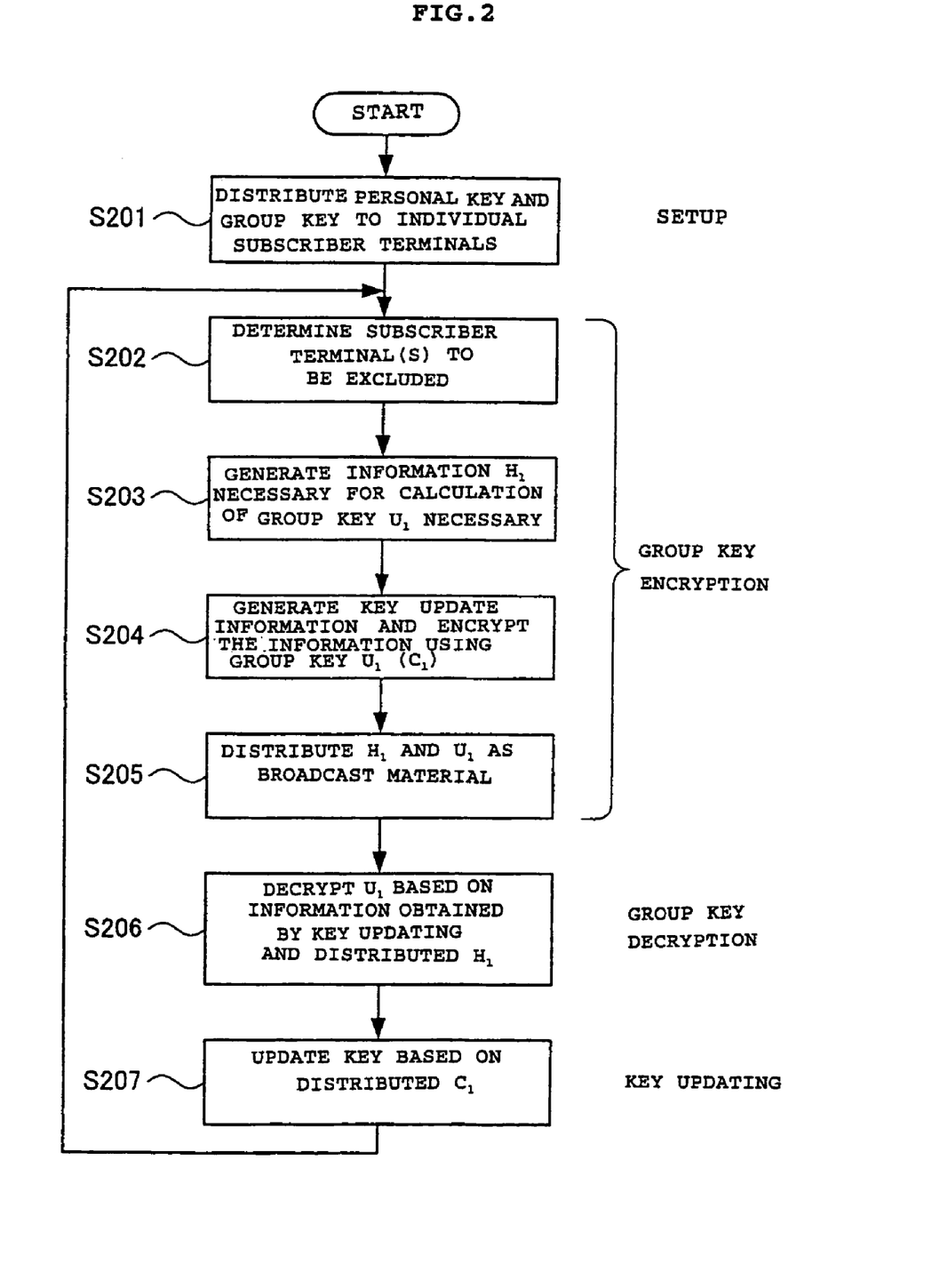
FIG. 2 is a flow chart explaining how cryptographic communication is performed according to the embodiment.

FIG. 2 is a flow chart diagram explaining how the cryptographic communication is performed in accordance with the present invention.

In the embodiment, a part of calculation, which part depends on the number "k," which represents the maximum number of excluded-target terminals, is separated as a precalculation (key updating) during the decryption of encrypted group key. This allows security to be maintained in an authenticated manner and further permits decryption of group key, except for key updating, to be performed at high speed, with modular exponentiation operations being executed two times. How a cryptographic communication protocol is constructed in accordance with the embodiment will be explained below. Note that in the following explanation, a receiver means a user who uses the subscriber terminal 20 and a subscriber itself.

1. Setup

Randomly selects a "k"th order polynomial with one variable in $Z_q$ represented by the following numerical expression 8.

[Numerical expression 8]
$$F(x) = S + \sum_{j=1}^{k} a_j x^j$$

$$G_1(x) = T_1 + \sum_{j=1}^{k} b_{1j} x^j$$

$F(0)=S$ and $G_1(0)=T_1$ are made to be a secret key the key distribution server 10. The key distribution server 10 secretly distributes $key_i=(s_i, f_{1i})=(F(i), g^{G1(i)/F(i)})$ as a decryption key for a receiver "i" in the first round to each subscriber terminal $i \in \{1,\ldots,n\}$. A group key $U_0 \in GF(q)$, is distributed to all of the subscriber terminals 20 (step 201).

2. Encryption of Group Key in the l-th Round

The key distribution server 10 randomly selects an element $r_l \in Z_q$ and determines $X_l:=g^{rl}$. Then, the server determines a set $\Lambda_l$ for "d" subscriber terminals 20 to be excluded (step 202). The server selects "(k−d)" pieces of integers from between "n+k(R−l)" and "n+kR" and determines a set $\Theta_l$ consisting of the "(k−d)" pieces of integers. The key distribution server 10 determines $M_{l1}, \ldots, M_{lk}$ based on the following numerical expression 9.

[Numerical Expression 9]
$$M_{lj}=r_l F(j)+G_l(j) \bmod q \, (j \in \Lambda_l \cup \Theta_l)$$

Furthermore, $\Omega_l$ (hereinafter, referred to as a subscriber terminal $\Omega_l$), which is an effective subscriber terminal 20, calculates header information $H_l$ needed to calculate a distribution key $U_l$ in the "l" round, using the following numerical expression 10 (step 203).

[Numerical Expression 10]
$$B_l=<X_l || \{(j, M_{lj}) | j \in \Lambda_l \cup \Theta_l\}>$$

$$H_l=E(U_{l-1}, B_l)$$

Note that the group key shared by the effective subscriber terminal "$\Omega_l$" in the "l" round is represented by $U_l=g^{rS+Tl}$.

Subsequently, the server generates key update information in order to distribute the group key in the "l+1" round (that is, the subscriber terminal 20 uses the information to update a key upon decryption of the group key in the "l+1" round). The key distribution server 10 randomly selects an element $b_{l+1,j} \in Z_q$ (j=0, ..., k) and determines an equation $(u_{l0}, \ldots, u_{lk})=(g^{bl+1,0}, \ldots, g^{bl+1,k})$, and based on the following numerical expression 11, encrypts the equation using the group key $U_l$ to determine $C_l$ (step 204).

[Numerical Expression 11]
$$C_l=E(U_l, u_{l0} || \ldots || u_{lk})$$

Then, the key distribution server 10 distributes $(H_l, C_l)$ as a broadcast material to all of the subscriber terminals 20 (i.e., $\Phi$) (step 205).

3. Decryption of Group Key in the "l" Round

The subscriber terminal "v," i.e., an element $v(\in \Omega_l)$, which is the subscriber terminal 20 capable of performing decryption in the "l" round, performs decryption in the "l" round based on the following numerical expression 12 (step 206).

[Numerical expression 12]
$$U = (X_l f_{lv})^{Wl1} g^{Wl2}$$

$$W_{l1} = s_v L(v) \bmod q$$

$$W_{l2} = \sum_{j \in \Lambda \cup \Theta} M_{lj} L(j) \bmod q$$

here, $$L(j) = \prod_{t \in \Lambda \cup \Theta \cup \{v\}/\{j\}} t/(t-j) \bmod q$$

That is, in this round, the subscriber terminal "v" decrypts the group key "$U_l$" in the "l" round using $f_{lv}$, which is previously calculated based on the information distributed in the "l−1" round, and "$B_l$," which is to be decrypted using $H_l$ distributed in the step 205.

4. Key Updating for the "l+1" Round (Pre-Calculation)

Based on the following numerical expression 13, the subscriber terminal "v," i.e., an element $v \in \Omega_l$, performs key updating as pre-calculation (i.e., processing prior to distribution of the group key in the "l+1" round) using the key update information contained in $C_l$, which is distributed from the key distribution server 10 (step 207).

[Numerical expression 13]
$$f_{l+1,v} = \left(\prod_{j=0}^{k} u_{lj}^{v^j}\right)^{1/s_v}$$

Additionally, the key distribution server 10 performs pre-calculation of the following numerical expression 14 prior to generation of group key in the "l+1" round.

[Numerical expression 14]
$$T_{l+1} = b_{l+1,0} \bmod q$$
$$G_{l+1}(x) = \sum_{j=0}^{k} b_{l+1,j} x^j \bmod q$$

Key updating (pre-calculation) should be performed by the subscriber terminal 20 and the key distribution server 10 using the information distributed along with the group key in the "l" round until before distribution of group key in the "l+1" round.

Whether the broadcasting type cryptographic communication system constructed as described above in accordance with the embodiment satisfies the four requirements in terms of security and efficiency will be identified.

First, it is apparent that the embodiment satisfies the requirement 1 because it does not need communication between the subscriber terminals 20.

Furthermore, the embodiment is constructed such that the length of an encrypted message to be distributed equals to O(k) and the size of a personal key to be distributed equals to O(1), also satisfying the requirement 3.

Additionally, the embodiment is constructed such that decryption is performed by executing modular exponentiation operations two times, also satisfying the requirement 4.

Subsequently, how the embodiment also satisfies the remaining requirement 2 will be shown.

First, model an attacker who "uses personal keys that "k" excluded subscriber terminals own," is described in the requirement 2. The behavior of the attacker can be modeled as an algorithm $M_l$ that determines a group key in the "R" round in polynomial time based on the decryption keys owned by "k" members who have been excluded until the "R" round and information received until the "R" round. Assume that the ("k") excluded subscriber terminals 20 are defined as subscriber terminals "i" (i=1, . . . , k) without losing generality. An input to $M_1$ is <g, p, q, k, $U_0$, ($s_1$, . . . , $s_k$), ($f_{11}$, . . . , $f_{1k}$), ($H_1$, $C_1$), . . . , ($H_R$, $C_R$)>

When the behavior of the attacker is modeled as described above, the requirement 2 can alternatively be described as follows using Decision Diffie-Hellman (DDH) Problem.

(Proposition)

"As long as an algorithm in polynomial time for solving DDH problem does not exist, $M_1$ never exists."

DDH problem is a judgment problem that D=<g, h, $g^a$, $h^a$> (this form is referred to as "Diffie-Hellman pair") and R=<g, h, $g^a$, $h^a$> are discriminated on GF(q) with a significant probability when randomly selecting elements g, h from a set GF(q), and elements a, b $\in Z_q$. An algorithm that solves DDH problem in polynomial time has not yet been known. That is, this problem is a mathematical problem, which can be assumed so that solving the problem is difficult in computational complexity, and $M_l$ does not exist based on the above-described proposition. Accordingly, the embodiment satisfies the requirement 2.

As described above, using the method for sharing a group key in the broadcasting type cryptographic communication system according to the embodiment, security can be maintained in an authenticated manner when a group key is updated and decryption can be performed by implementing a part of decryption for the group key as pre-calculation before distribution of the group key and further performing modular exponentiation operations only two times without depending on the number "n," which represents the number of subscriber terminals, and the number "k," which represents the maximum number of excluded-target terminals, after distribution of the updated group key. Accordingly, the method is effective particularly in a network system including a very large number of the subscriber terminals 20 therein.

Subsequently, examples constructed by applying the broadcasting type cryptographic communication system according to the embodiment to a variety of network systems will be explained below.

[Management of Group Member in Peer to Peer System]

The embodiment can be employed in a Peer to Peer (P2P) network system to perform communication within a group in a secure manner and at high speed. That is, all the peers within a group in a network system share one key (group key) and perform broadcasting type cryptographic communication.

Figure 3:
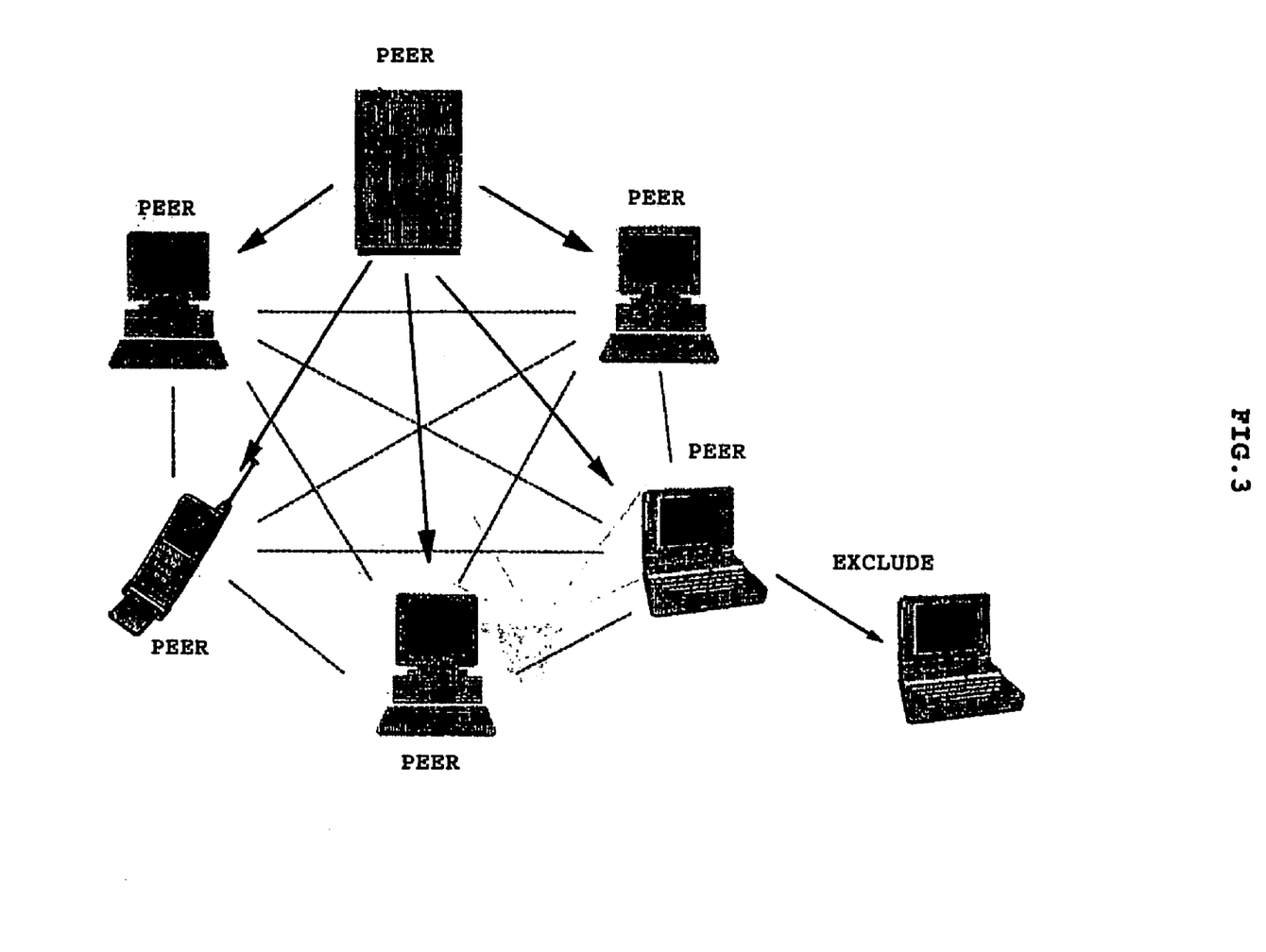
FIG. 3 is a diagram explaining the configuration of a peer-to-peer network system employing the embodiment.

FIG. 3 is a diagram explaining the configuration of a peer-to-peer network system employing the embodiment. As shown in FIG. 3, a group manager in problem in the network system constitutes the key distribution server 10 of the embodiment and the individual peers within the group constitute the subscriber terminals 20.

In the above-described network system, when a specific peer leaves the group in the same manner as that in the case where a member leaves "jxta" using "leave" command, in order to perform secure communication within the group after the peer leaves the group, the remaining peers are required to again share a new group key as quickly as possible. At the same time, since a variety of terminals are able to be a peer in the peer-to-peer network system, the system needs to be constructed such that even a terminal whose computing ability is extremely limited can easily obtain the group key. The embodiment can be employed in such peer-to-peer network system to manage the members within the group.

When employing the embodiment, since decryption of group key can completely be performed by executing modular exponentiation multiplication 2 times, the terminal within the group is not required to have large computing ability. Furthermore, even when applying the embodiment to a large scale network, a group key can be updated at a high speed without losing efficiency to be available.

[Real Time Contents Distribution System]

As a game machine becomes increasingly sophisticated, an advanced on-line game emerges by configuring a peer-to-peer network, each game machine being defined as a peer. That is, a server corresponding to a group manager supplies game contents to individual game machines and then the user plays the game by performing peer-to-peer communication through the game machine.

Figure 4:
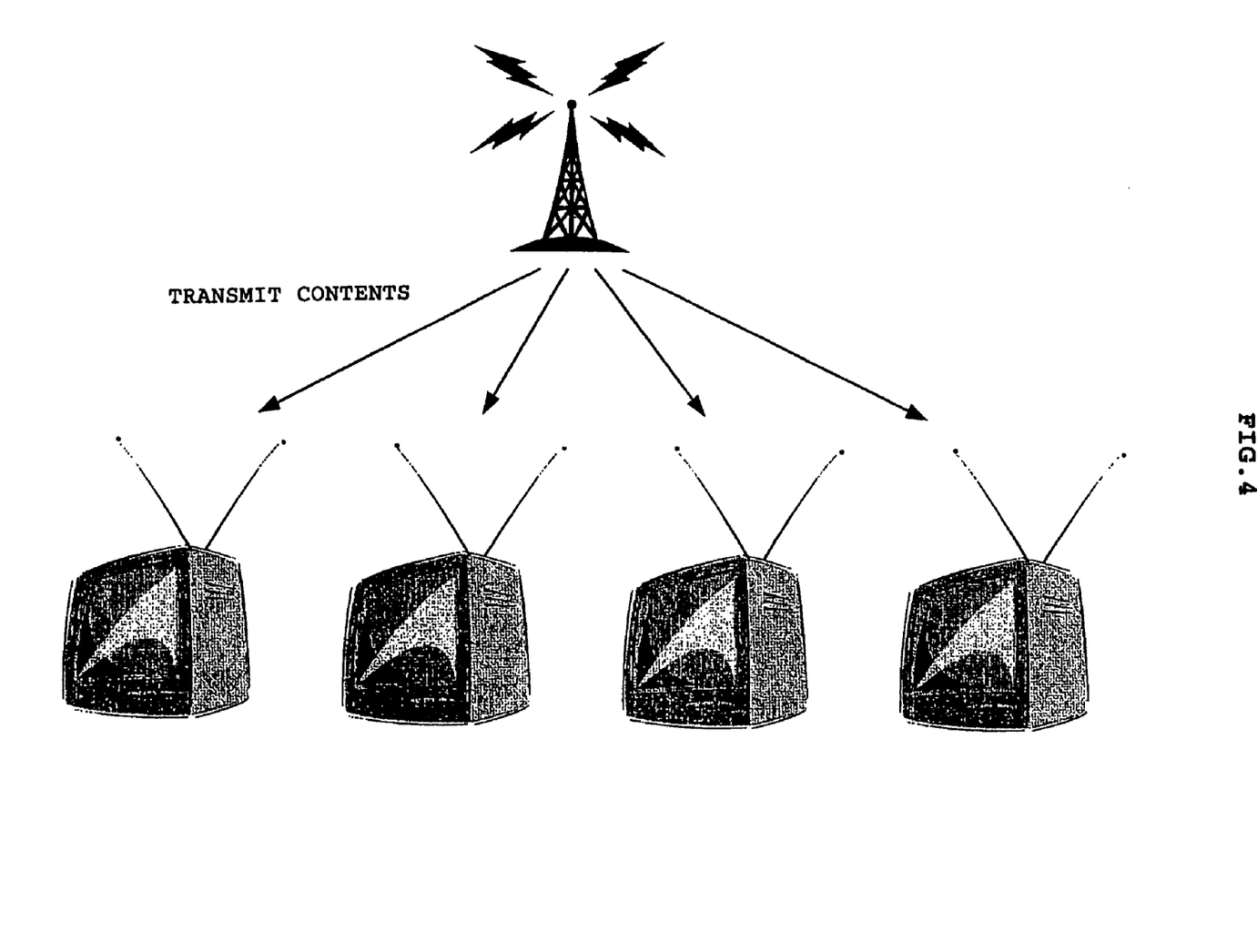
FIG. 4 is a diagram explaining the configuration of a real time contents distribution system employing the embodiment.

FIG. 4 is a diagram explaining the configuration of a real time contents distribution system employing the embodiment. As shown in FIG. 4, a server for distributing game contents constitutes the key distribution server 10 of the embodiment and the individual game machines constitute the subscriber terminals 20.

Under such environment, although it is expected that broadcasting type cryptographic communication needs to frequently be performed within a group, it is also expected that leave from the membership of group frequently occurs. For instance, a user who falls behind in his/her membership charge has to be disconnected from the group. Accordingly, reducing time to perform decryption for sharing a group key with the remaining members, which is required when a member leaves the group, ensures high availability of application.

The broadcasting type cryptographic communication system according to the embodiment achieves high-speed decryption capability and can be available for a large scale network, and therefore, can be applied to distribution of contents in the system shown in FIG. 4. That is, the system of the embodiment allows the group key to be shared at high speed and permits the contents encrypted by the group key to be decrypted simultaneously upon reception of the contents, i.e., in real time. Furthermore, time consuming key updating can be performed after reception of the contents using excess processing capability upon execution of the contents. Note that although an example in which communication is performed such that contents are distributed to execute an on-line game is explained, it is needless to say that the broadcasting type cryptographic communication according to the embodiment can be applied to the case where a variety of contents, excluding game contents, to be executed in real time are distributed.

[Distribution of Data to Portable Telephone Subscriber]

In recent years, portable telephones have drastically been spreading and are now owned and used by over half the people in the country. Then, assume the case where a cryptographic group communication service is provided to some million portable telephone subscribers. For instance, the case includes a case where a specific service is provided to terminals constituting a group.

Figure 5:
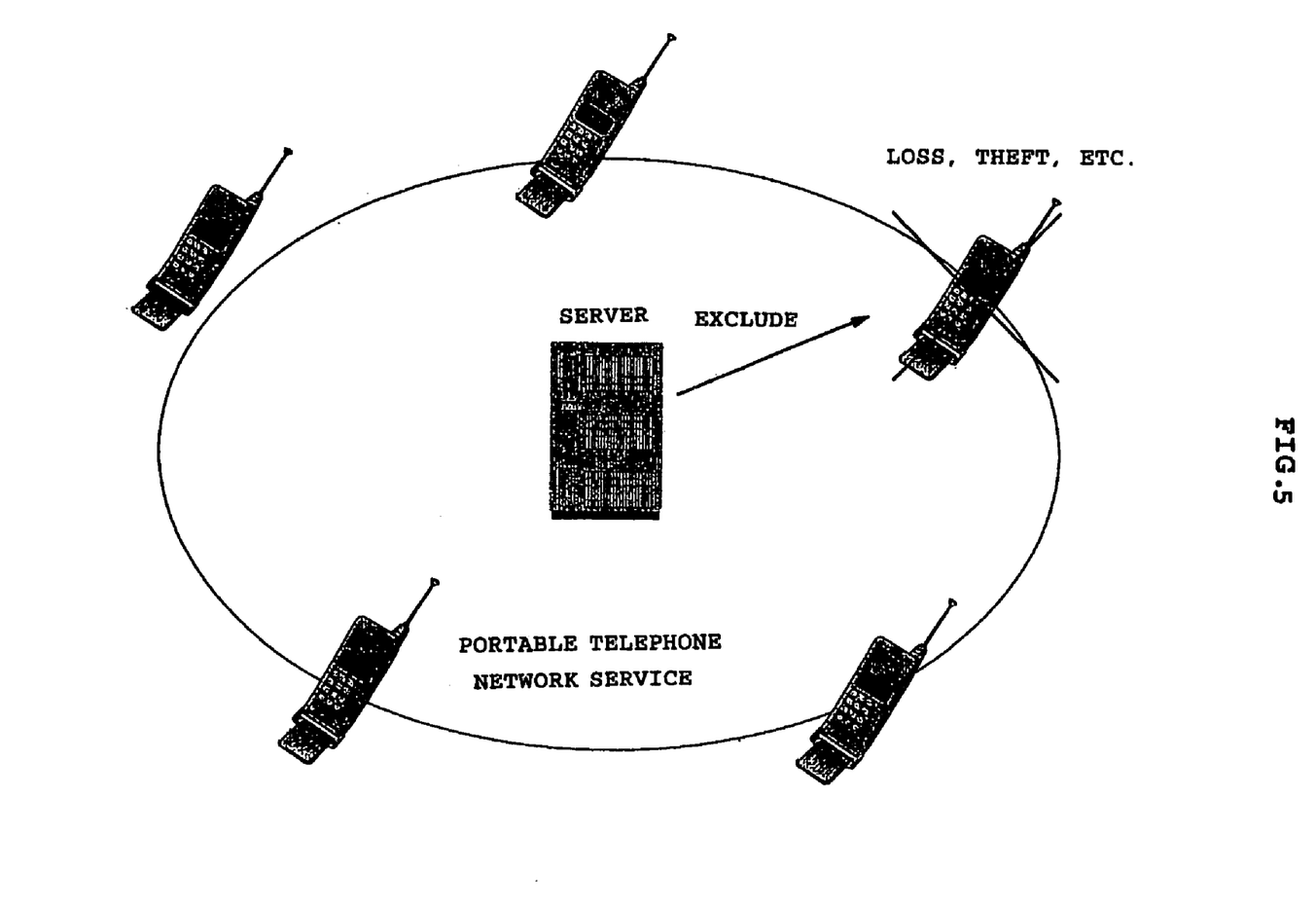
FIG. 5 is a diagram explaining the configuration of a system, employing the embodiment, for providing services to portable telephones.

FIG. 5 is a diagram illustrating the configuration of a service supply system for portable telephones, to which system the embodiment is applied. As shown in FIG. 5, a server for supplying services constitutes a key distribution server 10 and portable telephones registered with the service constitute subscriber terminals 20.

In the network system thus configured, when a subscriber falls behind in his/her membership charge or has his/her terminal lost or robbed, permissions to access a group, which permissions are given to specific terminals, have to be destroyed. According to the embodiment, even a portable telephone having poor computing ability is able to perform the broadcasting type cryptographic communication by applying the present invention thereto.

[Multimedia Contents Distribution System]

In recent years, a multimedia contents distribution system using a DVD has explosively been spreading.

Figure 6:
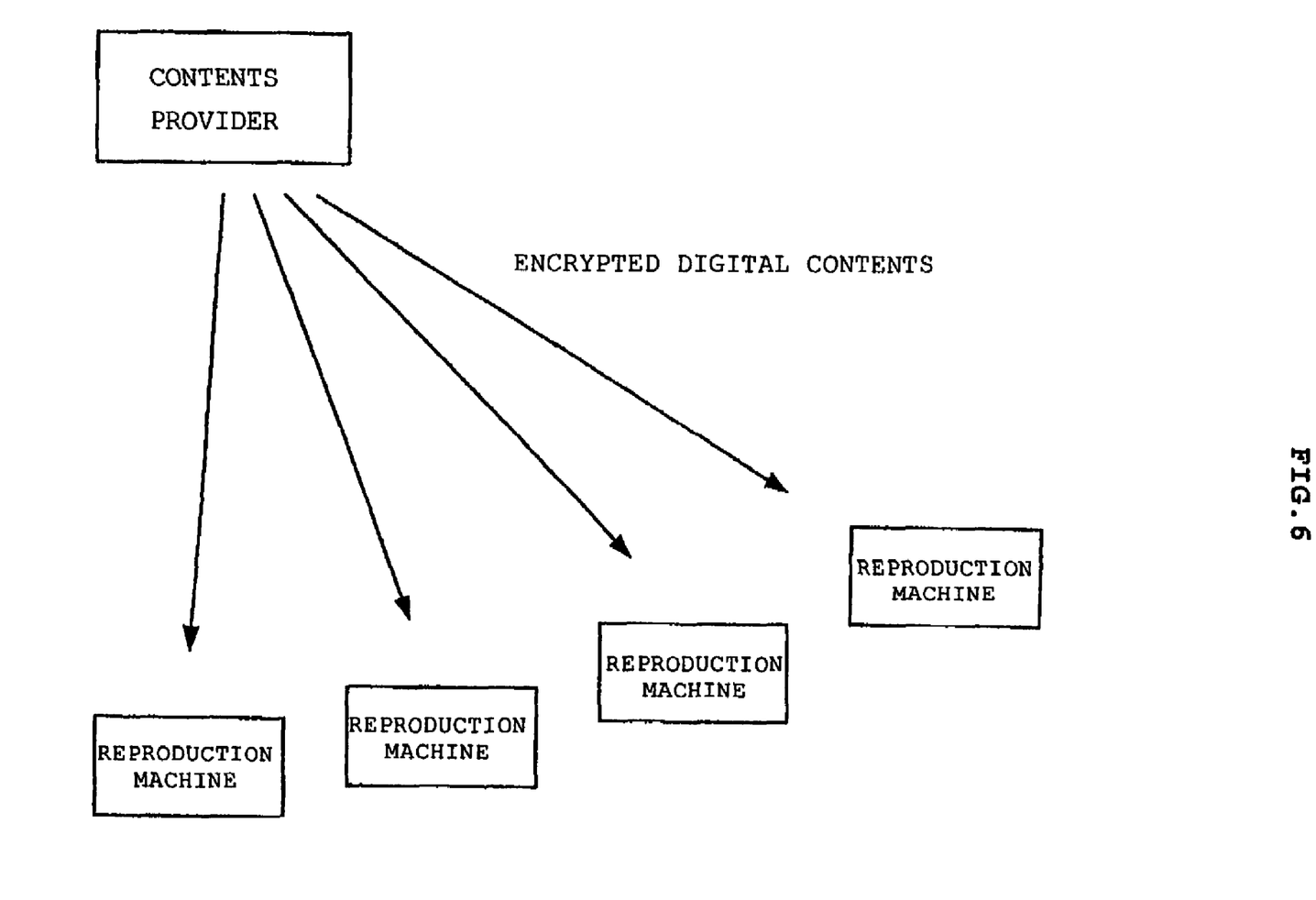
FIG. 6 is a diagram explaining the configuration of a system, employing the embodiment, for distributing multi-media contents.

FIG. 6 is a diagram illustrating the configuration of a multimedia contents distribution system constructed in accordance with the embodiment. As shown in FIG. 6, a contents provider who provides multimedia contents constitutes the key distribution server 10 and reproduction machines for reproducing the multimedia contents constitute the subscriber terminals 20.

In the system, a DVD medium is distributed storing encrypted digital contents (e.g., movie, music and software) therein. The encrypted contents are decrypted using a decryption key stored within a decipher/reproducer incorporated in the reproduction machine. The decryption key is different depending on individual makers and is stored in a secure memory area of the decipher/reproducer. However, there is danger that the decryption key is leaked, which is observed when crackers analyse the encryption key or a maker fails to correctly make up the key. In this case, it is required to provide a cryptographic algorithm that makes some encryption keys unavailable.

When employing the embodiment, security can be maintained in an authenticated manner and updating of the decryption key can be performed in order to make some encryption keys unavailable.

[Secret Broadcasting System to Address Problem of Loss/Theft of Police Radio Transceiver]

Police radio is a typical example of a confidential communication within a group. In this case, a system used for confidential communication needs to be constructed such that even when using a radio receiver except the transceiver owned by a police officer, the communications cannot be monitored.

Figure 7:
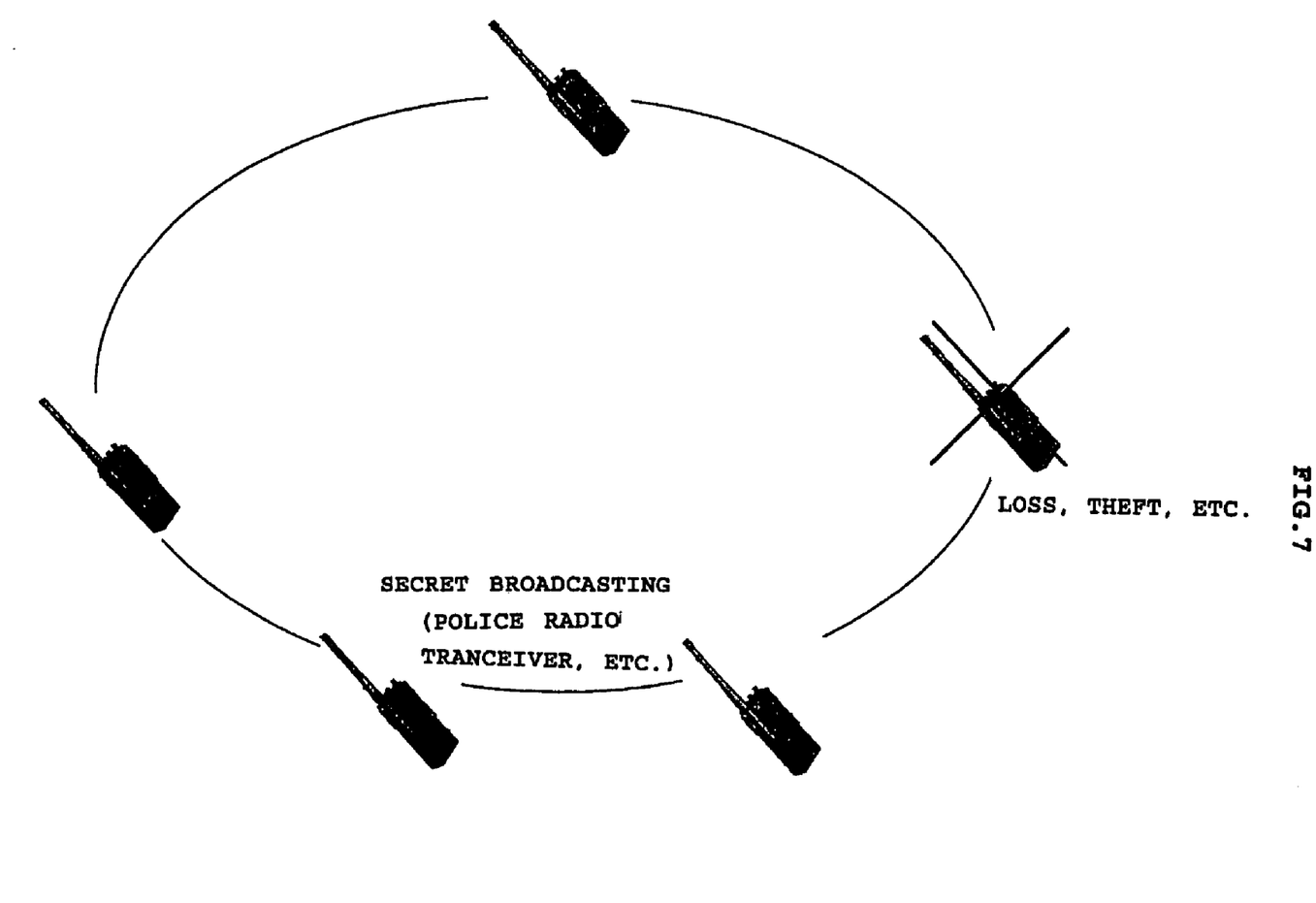
FIG. 7 is a diagram explaining the configuration of a secret broadcasting system employing the embodiment.

FIG. 7 is a diagram illustrating the configuration of a secret broadcasting system employing the embodiment. As shown in FIG. 7, a broadcasting station for secret broadcasting constitutes the key distribution server 10 and individual radio receivers constitute the subscriber terminals 20.

As described above, secret broadcasting such as police radio communication should be performed such that even when using a radio receiver except the transceiver owned by a police officer, communications cannot be monitored. However, in the event a police officer has his/her transceiver lost or robbed, the transceiver lost or robbed is excluded from the group ($\Phi$) consisting of the subscriber terminals 20 and then a new group key is shared by the remaining subscriber terminals in accordance with the embodiment, thereby making the lost transceiver unavailable.

INDUSTRIAL APPLICABILITY

As described so far, according to the present invention, a method for updating a group key in a highly secure manner and at a high speed can be provided.

Furthermore, according to the present invention, highly secure and highly efficient broadcasting type cryptographic communication can be achieved.

The invention claimed is:

1. A cryptographic communication system comprising:
   a key distribution server for distributing a key used to decrypt encrypted information; and
   a specific number of subscriber terminals using said information, wherein said key distribution server distributes:
   an encrypted first group key used to decrypt said information;
   individual decryption information respectively corresponding to each one of said specific number of subscriber terminals and used to perform decryption of said first group key; and
   individual terminal unique key update information respectively corresponding to each one of said specific number of subscriber terminals and used to perform a part of decryption of a second group key, said second group key being updated after a group key is updated,
   and wherein said specific number of subscriber terminals decrypt said first group key distributed from said key distribution server by use of results obtained by processing operations performed based on said terminal unique key update information previously obtained and used to decrypt said first group key, as well as by use of said decryption information distributed from said key distribution server.

2. The cryptographic communication system according to claim 1, wherein said specific number of subscriber terminals implement a part of decryption of said group key, said decryption being performed using said individual terminal unique key update information, before distribution of said group key.

3. The cryptographic communication system according to claim 1, wherein said key distribution server distributes to said specific number of subscriber terminals terminal unique key update information, used to decrypt said first group key, together with a third group key, said third group key being in a state before said third group key gets updated to said first group key.

4. The cryptographic communication system according to claim 1, wherein in the event where said key distribution server updates said group key, said key distribution server determines which subscriber terminals among said specific number of subscriber terminals are to be excluded and distributes to said specific number of subscriber terminals, together with said group key being updated, said decryption information used by remaining subscriber terminals other than said subscriber terminals to be excluded to make said remaining subscriber terminals able to decrypt said group key being updated.

5. A computer readable medium having executable instructions stored thereon to cause a key distribution server to distribute a key used to decrypt encrypted information, the computer readable medium comprising:
    means for generating a first group key used to decrypt said information and encrypting said first group key;
    means for generating individual decryption information used to perform decryption of said first group key and corresponding to subscriber terminals;
    means for generating individual terminal unique key update information used to perform a part of decryption of a second group key, said second key being updated after a group key is updated, and corresponding to said subscriber terminals; and
    means for respectively distributing said first group key, said decryption information and said terminal unique key update information to each one of said corresponding subscriber terminals.

6. The computer readable medium according to claim 5, wherein said means for generating said decryption information determines which terminals among said subscriber terminals are to be excluded and generates said decryption information used by remaining subscriber terminals other than said subscriber terminals to be excluded in order to make said remaining subscriber terminals able to decrypt said group key.

7. A computer readable storage medium having executable instructions stored thereon to cause a terminal device to operate, the computer readable storage medium comprising:
    means for retrieving from a specific key distribution server an encrypted group key, the encrypted group key being usable to decrypt encrypted information, and individual terminal unique decryption information uniquely corresponding to the terminal device used to decrypt said group key;
    means for performing a part of decryption of said group key before distribution of said group key; and
    means for decrypting said group key by use of results obtained by processing operations performed based on a part of decryption of said group key and said decryption information retrieved from said key distribution server.

8. A computer readable storage medium having executable instructions stored thereon to execute a program for controlling a computer and then distributing a key used to decrypt encrypted information, said program making said computer have capabilities including:
    a function of generating a first group key used to decrypt said information and encrypting said first group key;
    a function of generating individual decryption information used to perform decryption of said first group key and corresponding to subscriber terminals;
    a function of generating individual terminal unique key update information used to perform a part of decryption of a second group key, said second key being updated after a group key is updated, and corresponding to said subscriber terminals; and
    a function of respectively distributing said first group key, said decryption information and said key update information to each one of said corresponding subscriber terminals via specific communication means.

9. A computer readable storage-medium having executable instructions stored thereon for controlling a computer and then achieving a specific function, said program making said computer have capabilities including:
    a function of retrieving from a specific key distribution server an encrypted group key, the encrypted group key being usable to decrypt encrypted information, and individual computer unique decryption information uniquely corresponding to the computer used to decrypt said group key via specific communication means;
    a function of performing a part of decryption of said group key before distribution of said group key; and
    a function of decrypting said group key by use of results obtained by processing operations performed based on a part of decryption of said group key and said decryption information retrieved from said key distribution server.

10. A computer readable storage medium having executable instructions stored thereon for controlling a computer and then distributing a key used to decrypt encrypted information, said program being made readable by said computer so as to make said computer have capabilities achieved though use of said program, said program including:
    a function of generating a first group key used to decrypt said information and encrypting said first group key;
    a function of generating individual decryption information used to perform decryption of said first group key and corresponding to subscriber terminals;
    a function of generating individual terminal unique key update information used to perform a part of decryption of a second group key, said second key being updated after a group key is updated, and corresponding to said subscriber terminals; and
    a function of respectively distributing said first group key, said decryption information and said key update information to each one of said corresponding subscriber terminals via specific communication means.

11. A computer readable storage medium having executable instructions stored thereon for controlling a computer and then achieving a specific function, said program being made readable by said computer so as to make said computer have capabilities achieved though use of said program, said program including:
    a function of retrieving from a specific key distribution server an encrypted group key, the encrypted group key being usable to decrypt encrypted information, and individual computer unique decryption information uniquely corresponding to the computer used to decrypt said group key via specific communication means;
    a function of performing a part of decryption of said group key before distribution of said group key; and
    a function of decrypting said group key by making use of results obtained by processing operations performed based on a part of decryption of said group key and said decryption information retrieved from said key distribution server.

12. The recording-medium according to claim 10, wherein said function of generating individual unique decryption information determines which subscriber terminals among said subscriber terminals are to be excluded and generates said unique decryption information used by remaining subscriber terminals other than said subscriber terminals to be excluded in order to make said remaining subscriber terminals able to decrypt said group key.

13. A key sharing method for making a specific number of terminals share a key used to decrypt encrypted information, said specific number of terminals making use of said information, said method comprising:

a step of making said specific number of terminals perform a part of decryption of an encrypted group key used to decrypt said information before distribution of said group key;

a step of respectively distributing to said specific number of terminals said group key and individual terminal unique decryption information uniquely corresponding to each one of said specific number of terminals used to perform a part of remaining decryption other than said part of decryption of said group key and corresponding to said specific number of terminals; and a step of making said specific number of terminals perform decryption of said group key using said unique decryption information being distributed and results obtained by performing a part of decryption of said group key, said part of decryption previously being performed.

14. The key sharing method according to claim 13, wherein information used to perform said part of decryption is distributed in advance of distribution of said group key to said specific number of terminals together with said group key, said group key being in a state before being updated.

* * * * *